(12) United States Patent  (10) Patent No.: US 8,958,545 B2
Pelletier et al.  (45) Date of Patent: Feb. 17, 2015

(54) CROSSTALK REDUCING CONDUCTOR AND CONTACT CONFIGURATION IN A COMMUNICATION SYSTEM

(71) Applicant: Belden CDT (Canada) Inc., Saint-Laurent (CA)

(72) Inventors: Antoine Pelletier, Ville LaSalle (CA); Luc Milette, Montreal (CA); Michel Bohbot, Montreal (CA); Gavriel Vexler, Montreal (CA)

(73) Assignee: Belden CDT (Canada) Inc., Saint-Laurent (CA)

( * ) Notice: Subject to any disclaimer, the term of this patent is extended or adjusted under 35 U.S.C. 154(b) by 0 days.

(21) Appl. No.: 13/779,517

(22) Filed: Feb. 27, 2013

(65) Prior Publication Data

US 2013/0177150 A1    Jul. 11, 2013

Related U.S. Application Data

(62) Division of application No. 11/719,464, filed as application No. PCT/CA2005/001753 on Nov. 17, 2005, now Pat. No. 8,477,928.

(60) Provisional application No. 60/628,136, filed on Nov. 17, 2004.

(30) Foreign Application Priority Data

Nov. 17, 2004  (CA) .................................. 2487760

(51) Int. Cl.
*H04M 1/76*  (2006.01)
*H04M 7/00*  (2006.01)
(Continued)

(52) U.S. Cl.
CPC ............. *H04M 3/18* (2013.01); *H01R 13/6461* (2013.01); *H01R 13/6473* (2013.01); *H01R 13/6477* (2013.01); *H01R 4/2416* (2013.01); *H01R 4/242* (2013.01)
USPC ...................................... 379/417; 379/413.04

(58) Field of Classification Search
USPC ........................................................ 379/417
See application file for complete search history.

(56) References Cited

U.S. PATENT DOCUMENTS 4,295,703 A   10/1981  Osborne
5,186,647 A    2/1993  Denkmann et al.
(Continued)

FOREIGN PATENT DOCUMENTS

CA       1176330 B1   10/1984
CA       2486596 A1    5/2005
(Continued)

OTHER PUBLICATIONS

International Search Report and Written Opinion corresponding to PCT/CA2005/001753, under date of mailing of Mar. 9, 2006.
(Continued)

*Primary Examiner* — Alexander Jamal
(74) *Attorney, Agent, or Firm* — Goudreau Gage Dubuc; Hugh Mansfield

(57) ABSTRACT

There is disclosed a method for reducing cross talk between first and second cables in a data transmission system, each of the cables comprised of a pair of conductors. The method comprises the steps of providing a first contact interconnected with a first conductor of the pair of conductors of the first cable, wherein the first contact emits a first signal, providing a pair of contacts, each of the pair of contacts interconnected with a different conductor of the pair of conductors of the second cable, and positioning the first contact relative to the pair of contacts such that an amplitude of the signal received at one of the second pair of contacts is substantially the same as an amplitude of the signal received at another of the second pair of contacts.

30 Claims, 12 Drawing Sheets

(51) Int. Cl.
*H04M 9/00* (2006.01)
*H04M 3/18* (2006.01)
*H01R 13/6461* (2011.01)
*H01R 13/6473* (2011.01)
*H01R 13/6477* (2011.01)
*H01R 4/24* (2006.01)

(56) References Cited

U.S. PATENT DOCUMENTS

| | | |
|---|---|---|
| 5,536,182 A | 7/1996 | Atoh et al. |
| 5,599,206 A | 2/1997 | Slack et al. |
| 5,967,853 A | 10/1999 | Hashim |
| 5,997,358 A | 12/1999 | Adriaenssens et al. |
| 6,045,391 A | 4/2000 | Jaag |
| 6,116,965 A | 9/2000 | Arnett et al. |
| 6,126,476 A | 10/2000 | Viklund et al. |
| 6,150,612 A | 11/2000 | Grandy et al. |
| 6,193,526 B1 | 2/2001 | Milner et al. |
| 6,238,231 B1 | 5/2001 | Chapman et al. |
| 6,270,381 B1 | 8/2001 | Adriaenssens et al. |
| 6,280,231 B1 | 8/2001 | Nicholls |
| 6,283,768 B1 | 9/2001 | Van Naarden |
| 6,309,240 B1 | 10/2001 | Daoud |
| 6,582,247 B2 | 6/2003 | Siemon |
| 6,592,395 B2 | 7/2003 | Brown et al. |
| 6,596,944 B1 | 7/2003 | Clark et al. |
| 6,641,411 B1 | 11/2003 | Stoddard et al. |
| 6,648,670 B1 | 11/2003 | Chen |
| 6,794,570 B2 | 9/2004 | Chou |
| 7,166,000 B2 | 1/2007 | Pharney |
| 7,168,993 B2 | 1/2007 | Hashim |
| 7,179,115 B2 | 2/2007 | Hashim |
| 7,186,148 B2 | 3/2007 | Hashim |
| 7,186,149 B2 | 3/2007 | Hashim |
| 7,190,594 B2 | 3/2007 | Hashim et al. |
| 7,201,618 B2 | 4/2007 | Ellis et al. |
| 7,204,722 B2 | 4/2007 | Hashim et al. |
| 7,223,115 B2 | 5/2007 | Hashim et al. |
| 7,264,516 B2 | 9/2007 | Hashim et al. |
| 7,314,393 B2 | 1/2008 | Hashim |
| 7,320,624 B2 | 1/2008 | Hashim et al. |
| 7,322,847 B2 | 1/2008 | Hashim et al. |
| 7,326,089 B2 | 2/2008 | Hashim |
| 7,422,467 B2 | 9/2008 | Siev et al. |
| 2003/0095395 A1 | 5/2003 | Clark et al. |
| 2004/0040730 A1 | 3/2004 | Chou |
| 2005/0136729 A1 | 6/2005 | Redfield et al. |
| 2005/0195584 A1 | 9/2005 | AbuGhazaleh et al. |
| 2006/0148325 A1 | 7/2006 | Hashim |
| 2006/0154531 A1 | 7/2006 | Kim et al. |
| 2006/0160428 A1 | 7/2006 | Hashim |
| 2006/0292920 A1 | 12/2006 | Hashim et al. |
| 2007/0184725 A1 | 8/2007 | Hashim |
| 2008/0293289 A1 | 11/2008 | Siev et al. |

FOREIGN PATENT DOCUMENTS

| | | |
|---|---|---|
| CN | 1348621 A | 5/2002 |
| EP | 0899823 A2 | 3/1999 |
| EP | 0899827 A2 | 3/1999 |
| FR | 2600825 A1 | 7/2006 |
| GB | 2347025 A | 8/2000 |
| JP | 11185886 A | 7/1999 |
| JP | 11233205 | 8/1999 |
| JP | 2002512420 A | 4/2002 |
| JP | 2002529894 A | 9/2002 |
| WO | 98/13899 | 4/1998 |
| WO | 99/03172 | 1/1999 |
| WO | 02/15339 | 2/2002 |
| WO | 2005/117200 A1 | 12/2005 |
| WO | 2006/132972 A1 | 12/2006 |

OTHER PUBLICATIONS

International Search Report corresponding to PCT/CA2007/00694 with a mailing date of Aug. 10, 2007.

European Patent Office, Communication under Rule 71(3) PEC, Feb. 9, 2011.

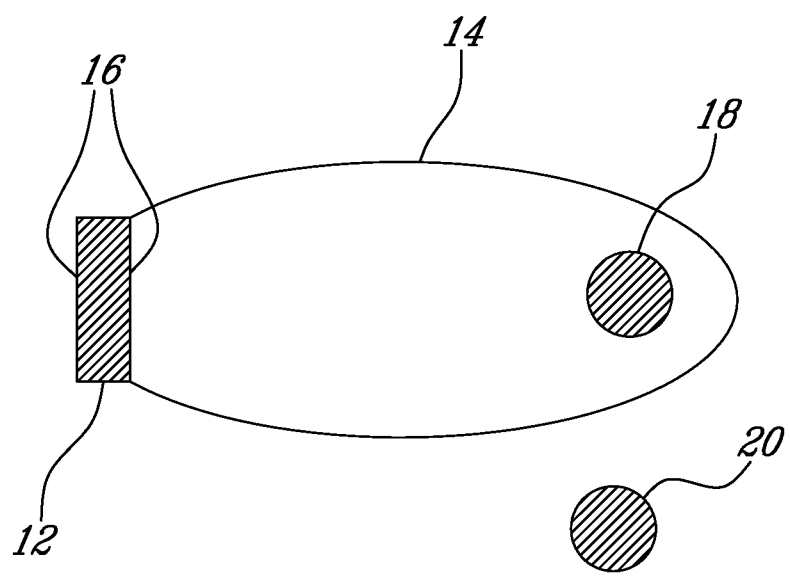

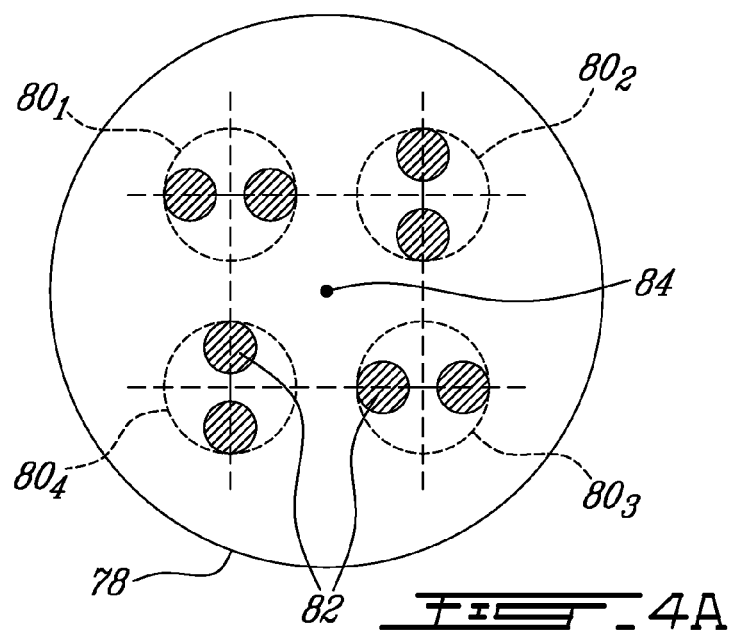
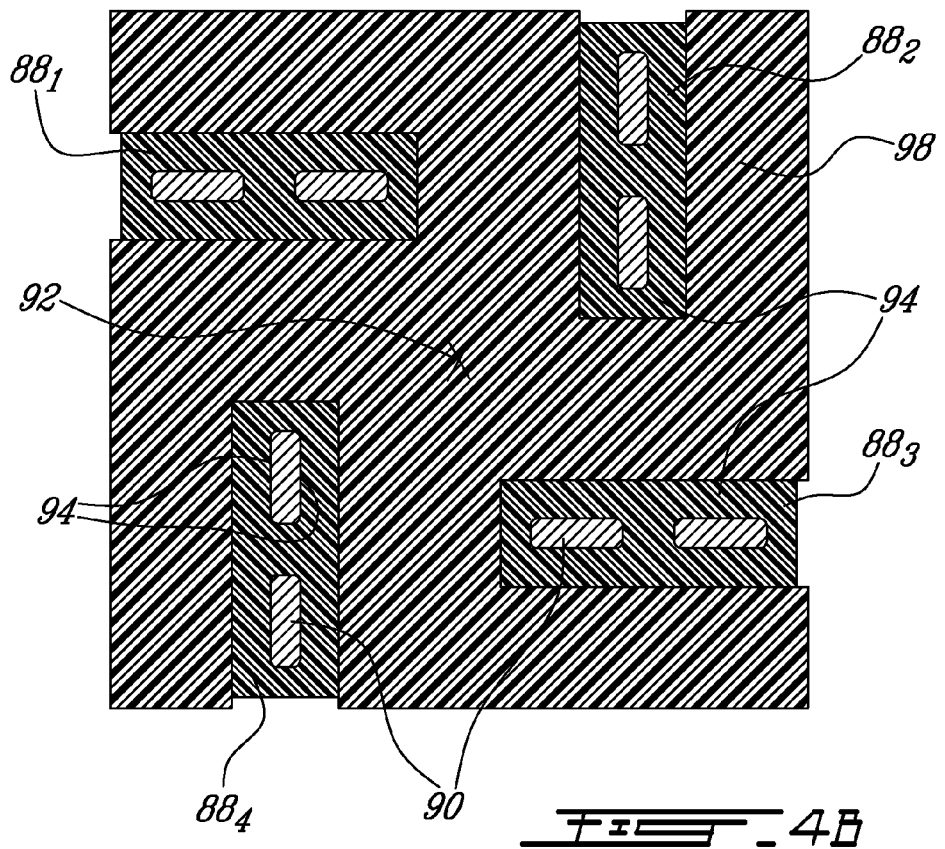

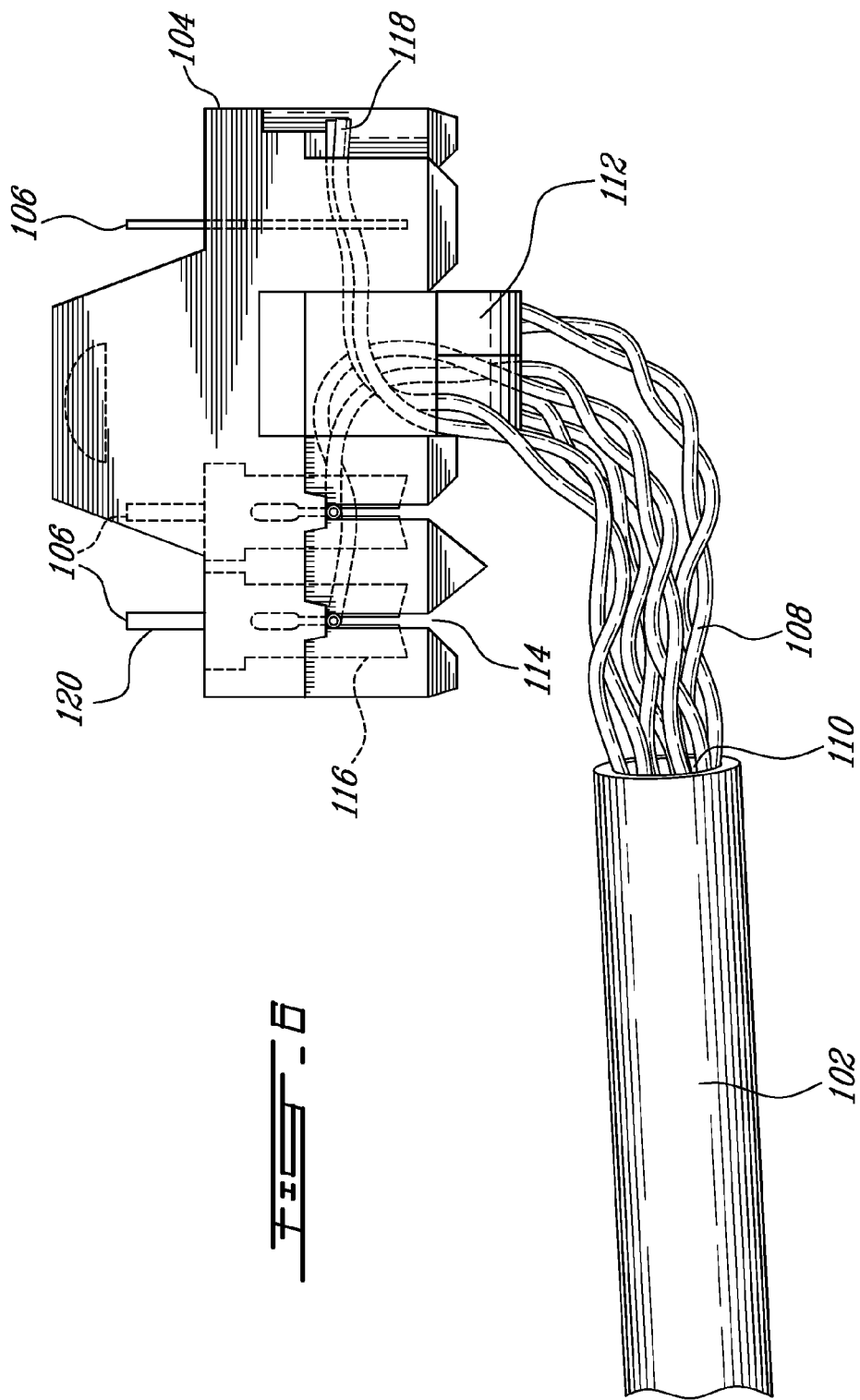

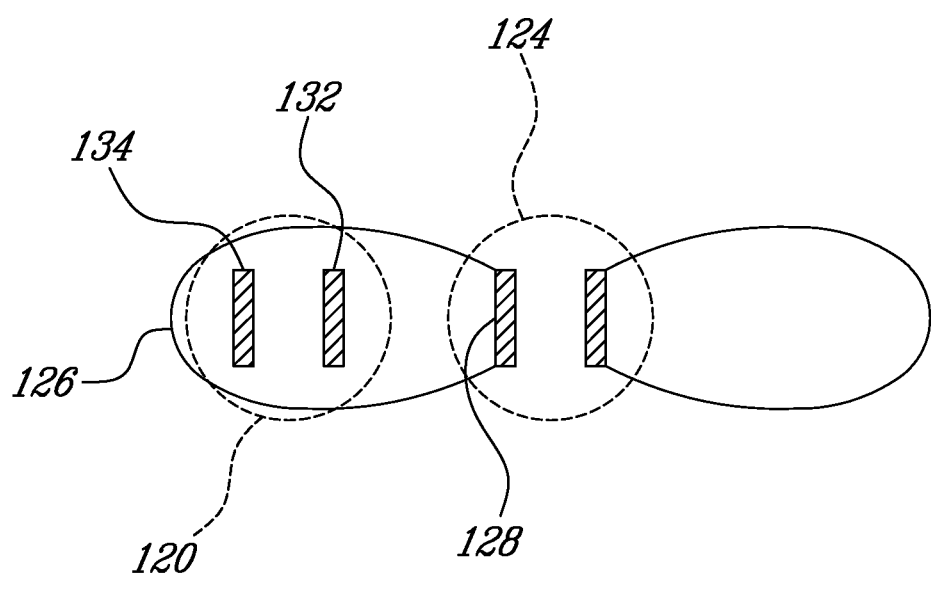

(a) 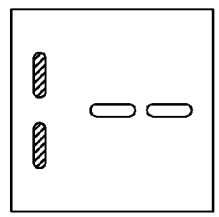
(b) 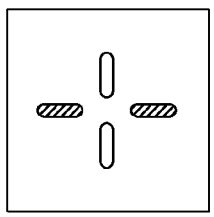
(c) 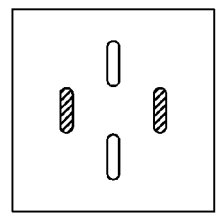
(d) 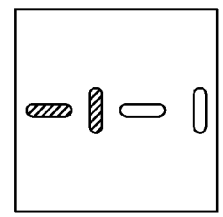
(e) 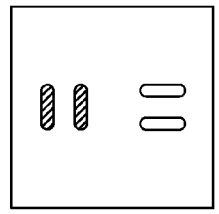
(f) 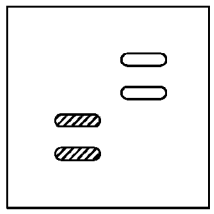
(g) 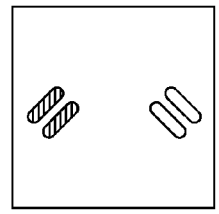
(h) 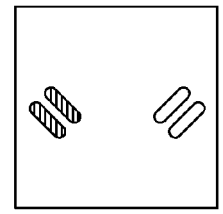
FIG. 9

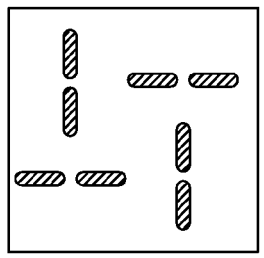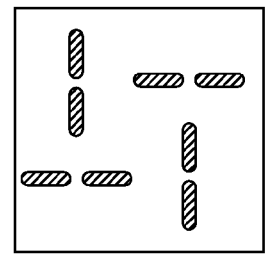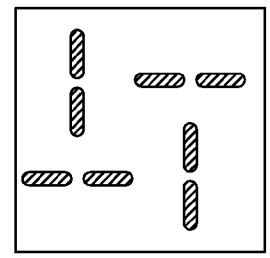
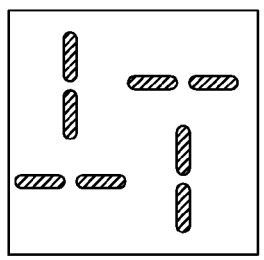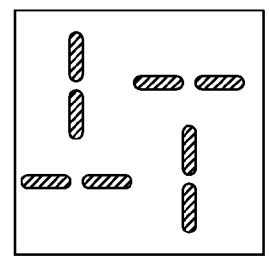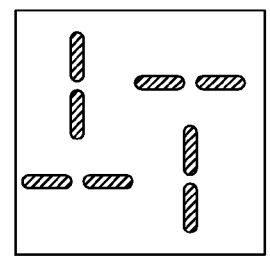
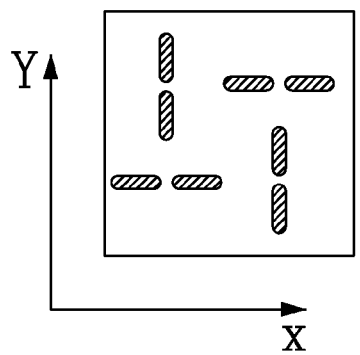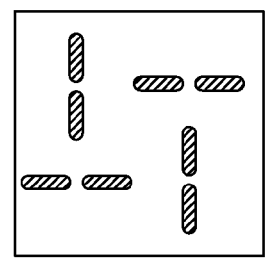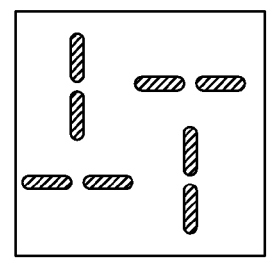
FIG. 11

CROSSTALK REDUCING CONDUCTOR AND CONTACT CONFIGURATION IN A COMMUNICATION SYSTEM

CROSS REFERENCE TO RELATED APPLICATIONS

This application is a divisional application of U.S. patent application Ser. No. 11/719,464 filed on Mar. 25, 2009 and which is a National Entry Application of PCT application Serial No. PCT/CA2005/001753 filed on Nov. 17, 2005 and published in English under PCT Article 21(2), which itself claims benefit of U.S. provisional application Ser. No. 60/628,136 filed on filed on Nov. 17, 2004 and on Canadian application No. 2,487,760 filed on Nov. 17, 2004. All documents above are incorporated herein in their entirety by reference.

BACKGROUND TO THE INVENTION

The present invention relates to a crosstalk reducing conductor and contact configuration in a communication system. In particular, the present invention relates to positioning emitting a receiving conductive paths in a communication system in order to reduce NEXT, FEXT, Alien NEXT, Alien FEXT and increase Signal to Noise Ratio (SNR).

BACKGROUND OF THE INVENTION

Assemblies for transmitting telecommunications signals at high frequencies via twisted pairs of conductors currently use a variety of means, such as shielding and the like to ensure that the interference (such as Alien NEXT) between adjacent cables and connectors in a system is minimised. These prior art systems typically suffer from the drawback that the reduction in Alien NEXT between adjacent cables and connectors is insufficient for data transfers at and above 10 gigabits per second. In particular, existing designs for ports (or jacks) are sufficient to achieve only about a 55 dB SNR, which is insufficient to meet the proposed 70 dB SNR necessary for the proposed 10 gig development standard.

SUMMARY OF THE INVENTION

In order to overcome the above and other drawbacks there is provided a method for reducing cross talk between first and second cables in a data transmission system, each of the cables comprised of a pair of conductors. The method comprises the steps of providing a first contact interconnected with a first conductor of the pair of conductors of the first cable, wherein the first contact emits a first signal, providing a pair of contacts, each of the pair of contacts interconnected with a different conductor of the pair of conductors of the second cable, and positioning the first contact relative to the pair of contacts such that an amplitude of the signal received at one of the second pair of contacts is substantially the same as an amplitude of the signal received at another of the second pair of contacts.

There is also provided a method for reducing cross talk between first and second cables in a data transmission system, each of the cables comprised of a pair of conductors. The method comprises the steps of providing a pair of contacts, each of the pair of contacts interconnected with a different conductor of the pair of conductors of the first cable, wherein one of the pair of contacts emits a first signal which is substantially an inverse of a second signal emitted by another of the pair of contacts, providing at least one first contact interconnected with one of the pair of conductors of the second cable, and positioning the pair of contacts relative to the first contact such that an amplitude of the first signal received by the first contact is substantially opposite to an amplitude of the second signal received by the first contact.

Furthermore, there is provided an assembly for terminating first and second cables in a telecommunications system, each of the cables comprising first and second conductors, the assembly comprising a first contact interconnected with the first conductor of the first cable, wherein the first contact emits a first signal, and a pair of contacts interconnected with a respective one of the first and second conductors of the second cable. The first contact is positioned relative to the pair of contacts such that an amplitude of the first signal received at one of the pair of contacts is substantially the same as an amplitude of the first signal received at another of the pair of contacts.

Additionally, there is provided an assembly for terminating first and second cables in a telecommunications system, each of the cables comprising a pair of conductors, the assembly comprising a pair of contacts interconnected with the pair of conductors of the first cable, wherein one of the pair of contacts emits a first signal which is substantially an inverse of a second signal emitted by another of the pair of contacts, and a first contact interconnected with a first conductor of the pair of conductors of the second cable. The pair of contacts is positioned relative to the first contact such that an amplitude of the first signal received by the first contact is substantially opposite to an amplitude of the second signal received by the second contact.

There is also provided an assembly for terminating first and second cables in a telecommunications system, each of the cables comprising a pair of conductors, the assembly comprising a first substantially flat contact interconnected with one of the pair of conductors of the first cable, and a second substantially flat contact interconnected with one of the pair of conductors of the second cable, wherein the first contact is arranged at right angles to the second contact.

Additionally, there is provided an assembly for terminating first and second cables in a telecommunications system, each of the cables comprising a pair of conductors, the assembly comprising a first contact interconnected with one of the pair of conductors of the first cable, and a pair of contacts interconnected with a respective one of the pair of conductors of the second cable, the pair of contacts positioned symmetrically about the first contact.

Also, there is provided a connector for terminating a cable comprising first and second pairs of conductors, the connector comprising a first contact interconnected with a conductor of the first pair of conductors, and a pair of contacts interconnected with a respective one of the second pair of conductors, the pair of contacts positioned symmetrically about the first contact.

Furthermore, there is also provided a connector for terminating a cable comprising first and second pairs of conductors, the connector comprising a first substantially flat contact interconnected with a conductor of the first pair of conductors, and a second substantially flat contact interconnected with a first conductor of the second pair of conductors, the first flat contact substantially at right angles to the second flat contact.

Additionally, there is provided a method for reducing cross talk in a data transmission system. The method comprises the steps of providing a first transmission path comprised of at least one conductor, the first conductor emitting a signal, providing a second transmission path comprised of a second pair of conductors, positioning the first conductor relative to the second pair of conductors such that an amplitude of the signal received at one of the second pair of conductors is substantially the same as an amplitude of the signal received at another of the second pair of conductors.

There is also provided a method for reducing cross talk in a data transmission system. The method comprises the steps of providing a first transmission path comprised of a first conductor, providing a second transmission path comprised of pair of conductors, wherein one of the pair of conductors emits a first signal which is substantially an inverse of a second signal emitted by another of the pair of conductors, and positioning the pair of conductors relative to the first conductor such that an amplitude of the first signal received by the first conductor is substantially opposite to an amplitude of the second signal received by the first conductor.

Additionally, there is provided an assembly for transmitting data comprising a first transmission path comprised of a first conductor, the first conductor emitting a first signal, and a second transmission path comprised of a pair of conductors. The first conductor is positioned relative to the pair of conductors such that an amplitude of the first signal received at one of the pair of conductors is substantially the same as an amplitude of the first signal received at another of the pair of conductors.

There is furthermore provided an assembly for transmitting data comprising a first transmission path comprised of a first conductor, and a second transmission path comprised of pair of conductors, wherein one of the pair of conductors emits a first signal which is substantially an inverse of a second signal emitted by another of the pair of conductors, wherein said first conductor is positioned relative to the pair of conductors such that an amplitude of the first signal received by the first conductor is substantially opposite to an amplitude of the second signal received by the first conductor.

There is also provided a data transmission cable comprising a first conductor, a pair of conductors arranged in parallel to the first conductor, and a cable jacket surrounding the first conductor and the pair of conductors. A distance between the first conductor and each of the pair of conductors is substantially the same.

There is also provided a data transmission cable comprising first pair of parallel conductors aligned on a first plane, and a second pair of conductors aligned on a second plane. The first plane is substantially at right angles to the second plane and the first plane intersects the second plane along an axis substantially between the second pair of conductors.

Additionally, there is provided a separator spline for separating pairs of conductors in a communication cable, the spline comprising an elongate main portion having four sides, and a conductive pair receiving slot moulded lengthwise in each side of the main portion. The moulded main portion has fylfot cross shaped transverse cross section.

BRIEF DESCRIPTION OF THE DRAWINGS

FIGS. 1A through 1C provide transverse cross sectional views of conductors in accordance with an illustrative embodiment of the present invention;

FIGS. 4A and 4B provide transverse cross sections of cable configurations in accordance with third and fourth alternative illustrative embodiments of the present invention;

FIG. 6 provides a side plan view of a twisted pair cable connected to the connector jack rear panel of FIG. 5;

FIG. 7 schematically illustrates the general electromagnetic radiation pattern generated by a standard Insulation Displacement Connector (IDC) in the presence of an electric potential;

FIG. 9 schematically illustrates alternative balanced pair configurations for reduced crosstalk in accordance with a series of alternative illustrative embodiments of the present invention;

FIG. 11 schematically illustrates a possible periodic connector configuration for reduced ANEXT and AFEXT in accordance with an illustrative embodiment of the present invention.

DETAILED DESCRIPTION OF THE ILLUSTRATIVE EMBODIMENTS

Figure 1A:
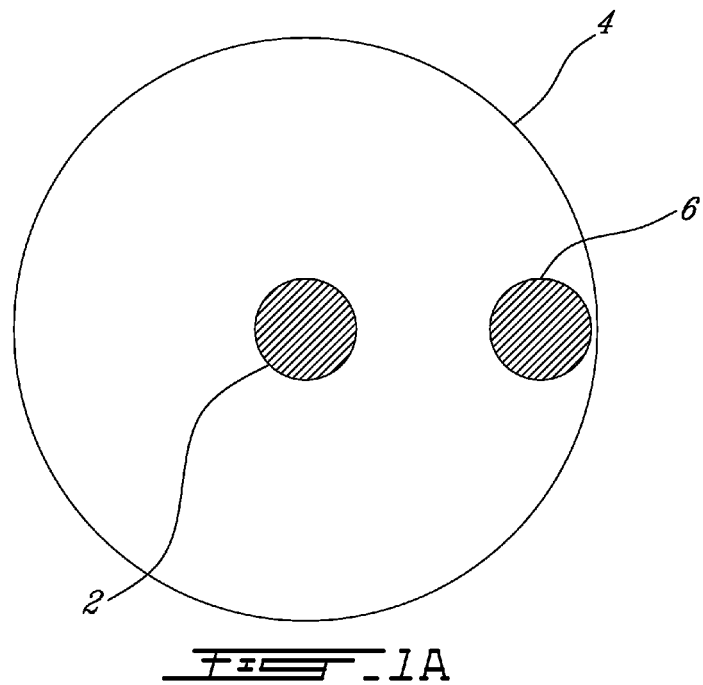

Referring now to FIG. 1A, as known in the art, as a signal (not shown) propagates along a first conductor 2 (viewed in transverse cross section in FIG. 3) the time varying currents within the conductor give rise to an electromagnetic field (or signal) 4 in the free space surrounding the conductor 6, that is the first conductor 2 acts in a fashion similar to a transmitting antenna. Additionally, placing a second 6 conductor within this electromagnetic field 4 induces time varying currents within the second conductor 6, or in other words this second conductor 6 acts in a fashion similar to a receiving antenna (in other words, the second conductor 6 is coupled to the first conductor 2).

Figure 1B:
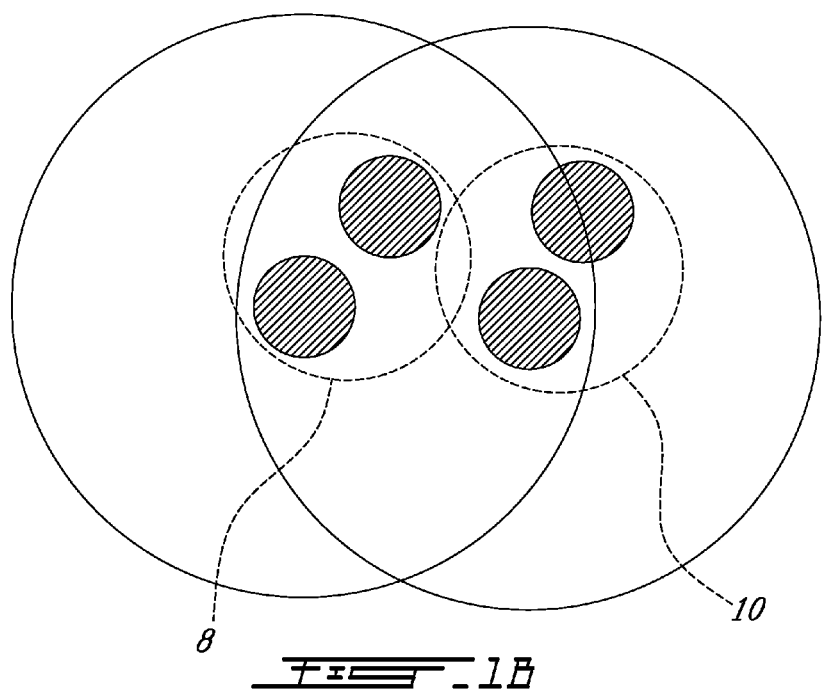

Referring now to FIG. 1B, in telecommunications systems, where signals are typically transmitted along transmission paths comprised of one or more pairs of conductors as in 8, 10 (again viewed in transverse cross section) the induction of time varying currents by the conductors of a first pair 8 in the conductors of the second pair 10 arises as noise on the signals being transmitted along the second pair 10, with a similar effect occurring in the opposite direction due to the signals being transmitted along the second pair 10. In high speed implementations, and as will be understood by a person of ordinary skill in the art, this noise can have a significant negative impact on the quality of the transmitted signals. Removal or reduction of this noise leads to a decrease in error rates and an increase in data throughput.

Still referring to FIG. 1B, as the coupling effect between transmission paths is much more acute for conductors which are arranged in parallel conductors in cables are typically twisted with different twist lays in order to reduce the probability that conductors of different pairs will be arranged in parallel thereby leading to a reduction in this coupling effect. In particular implementations, however, for example at connector interfaces, on Printed Circuit Boards (PCBs) or in flat cables, the conductors typically run in parallel over a discrete distance which gives rise to an increased coupling between conductors.

Referring now to FIG. 1C, this coupling effect can be further exacerbated, in cases where an emitting conductor 12 comprises a substantially flat transverse cross section, as a parasitic signal 14 generated by signals propagating along the conductor 12 is emitted in a concentrated region generally perpendicular to the long surfaces 16 of the flat conductor 12. As a result, a second conductor 18 which finds itself located opposite one of the long surfaces 16 will be subjected to an increased parasitic signal 14. On the other hand, a third conductor 20 located outside of the main lobe of the parasitic signal 14 will be subject to a reduced electromagnetic field with a subsequent reduction in the coupling effect and noise induced by signals propagating along the flat conductor 12.

Figure 2A:
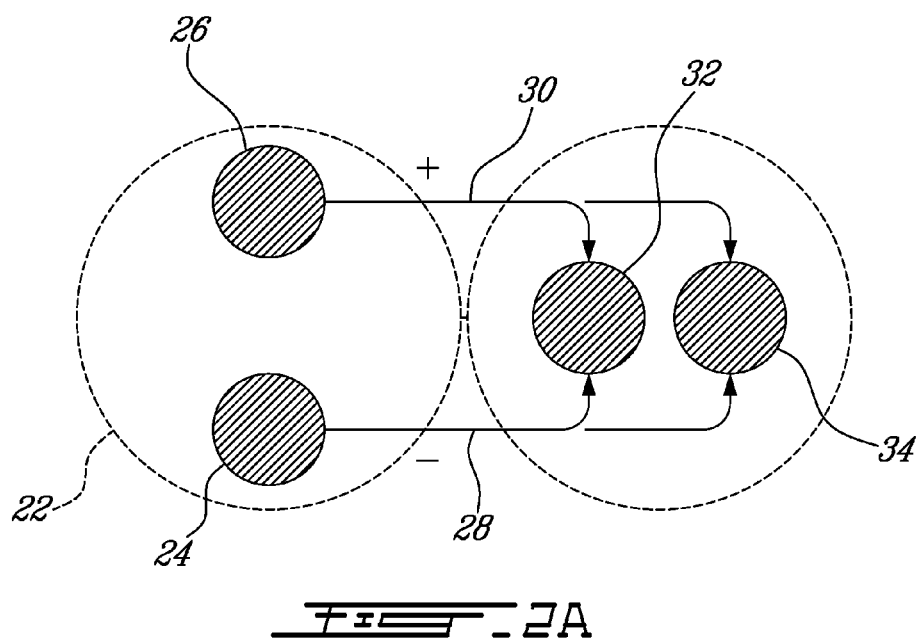
FIGS. 2A and 2B provide transverse cross sections of emitting and receiving conductors in accordance with an illustrative embodiment of the present invention.

In order to combat the effects of parasitic electrical fields (or signals) emitted by a conductor, a number of strategies can be used. Referring now to FIG. 2A, as known in the art balanced pairs of conductors 22 are used to propagate differential signals, with a first conductor 24 propagating a signal which is essentially the inverse of a signal propagated by a second conductor 26. These inverse signals give rise to first and second differential parasitic signals 28 and 30 being emitted by the conductors 24, 26. As a result, a third conductor 32 positioned in parallel and adjacent to the balanced pair 22 will receive the differential parasitic signals 28 and 30. By positioning the third conductor 32 such that the strengths (power) of the first parasitic signal 28 and the second parasitic signal 30 as received by the third conductor 32 are substantially the same, for example by placing the third conductor 32 such that the conductors 24, 26 are symmetrical about the third conductor 32 (or in other words by placing the third conductor 32 such that it is equidistant to either of the conductors 24, 26), the amplitudes of the received first and second parasitic signals 28, 30 at any point in time will be opposite, giving rise to a cancelling effect in the third conductor 32. A similar effect will arise in a fourth conductor 34 (positioned in parallel and adjacent to the balanced pair 22) which is also positioned such that the strengths received first and second parasitic signals 28, 30 are substantially the same.

Figure 2B:
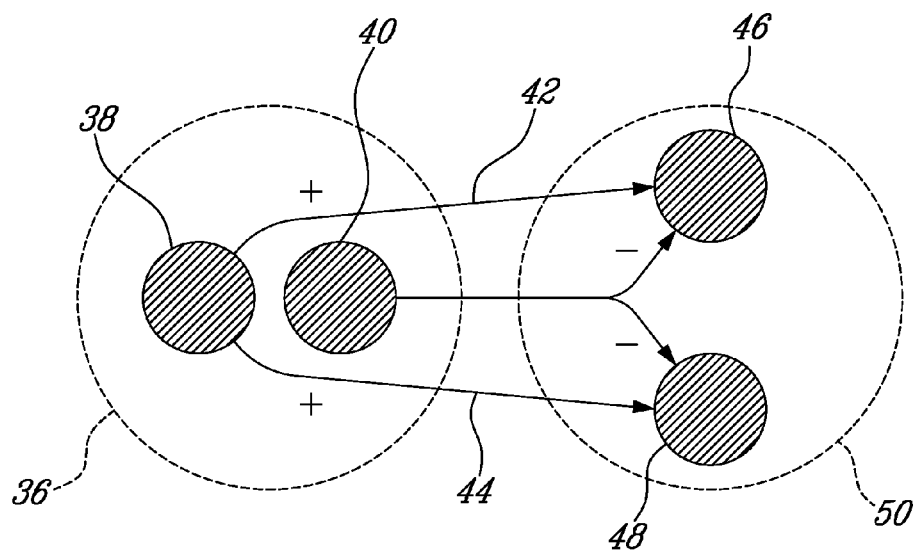

Referring now to FIG. 2B, in the reverse case to the case described in reference to FIG. 2A, the differential signals propagated by a first balanced pair 36 comprised of a first conductor 38 and a second conductor 40 give rise to first and second parasitic signals 42, 44 being emitted by the conductors 38, 40. Once again, third and fourth conductors 46, 48 which are arranged in parallel to the first and second conductors 38, 40 receive these parasitic signals 42, 44. Provided the third and fourth conductors 46, 48 are of the same balanced pair 50, by positioning the third and fourth conductors 46, 48 such that the received strength of the first parasitic signal 42 is the same at both the third and fourth conductors 46, 48, and the received strength of the second parasitic signal 44 is the same at both the third and fourth conductors 46, 48, only common mode noise will be introduced onto the third and fourth conductors 46, 48. Given the balanced nature of the balanced pair 50, common mode noise is compensated for.

The above generally described configurations can be taken advantage of in a number of implementations, some of which are described hereinbelow, in particular in the cases of transmission paths within cables and on PCBs and through connector interface assemblies. Of note is that the above generally described configurations can be taken advantage either within a transmission path (for example in a transmission cable comprised of four balanced pairs of conductors), in order to reduce cross talk such as NEXT and FEXT, or between transmission paths (such as between adjacent connectors terminating different cables each comprised of four pairs of conductors), in order to reduce Alien cross talk such as ANEXT and AFEXT.

Figure 3A:
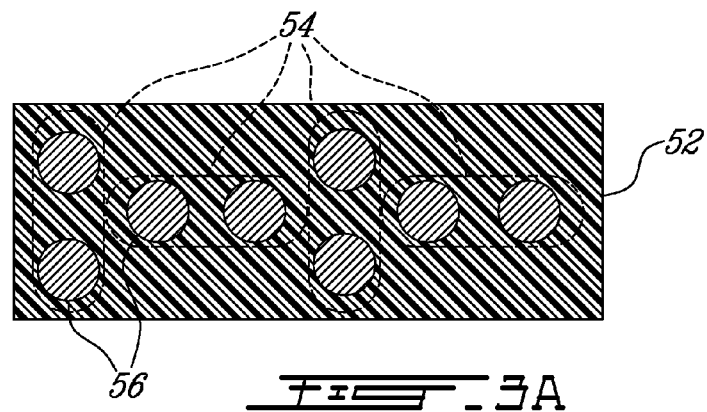
FIGS. 3A through 3C provide transverse cross sections of conductor configurations in accordance with an alternative and first and second illustrative embodiments of the present invention.

In applications such as flat cables, the conductors run generally in parallel along the length of the cable and as a result the potential for adverse generation of parasitic signals between conductors is increased. Referring now to FIG. 3A, a cable 52 (viewed in transverse cross section) in accordance with an illustrative embodiment of the present invention comprises four (4) balanced pairs of conductors as in 54. As will be apparent from FIG. 3A, the conductors as in 56 of adjacent balanced pairs as in 54 are oriented such that the noise induced by the conductor(s) of one balanced pair on the conductor(s) of an adjacent balanced pair is either differential and effectively cancelled, or common and thus is compensated for.

Figure 3B:
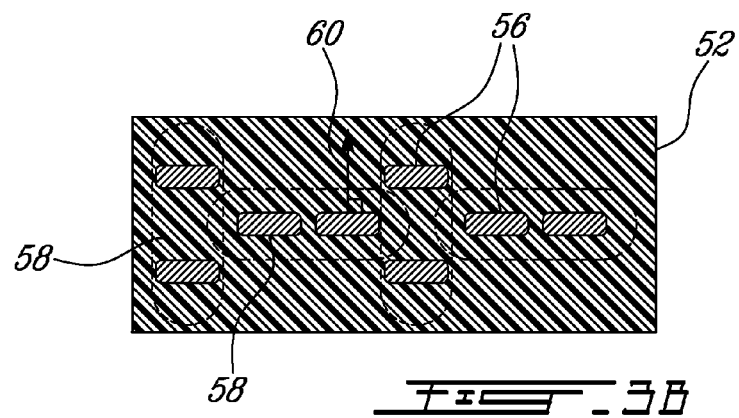

Referring to FIG. 3B, in an alternative illustrative embodiment of a cable 52 (again viewed in transverse cross section) in accordance with the present invention, this effect can be further enhanced by providing conductors as in 56 having an elongate transverse cross section, and ensuring that the conductors as in 56 of a first balanced pair are arranged such that they are not within the main lobe of the parasitic signals emitted by the conductor(s) of an adjacent balanced pair. In this regard, as the main lobe of the emitted parasitic signals is located generally in front of a long transverse surface as in 58, it generally suffices to ensure that the conductors of an adjacent balanced pair are not intersected by a line 60 which is perpendicular (or normal) to the long transverse surface(s) of a conductor of an adjacent balanced pair.

Figure 3C:
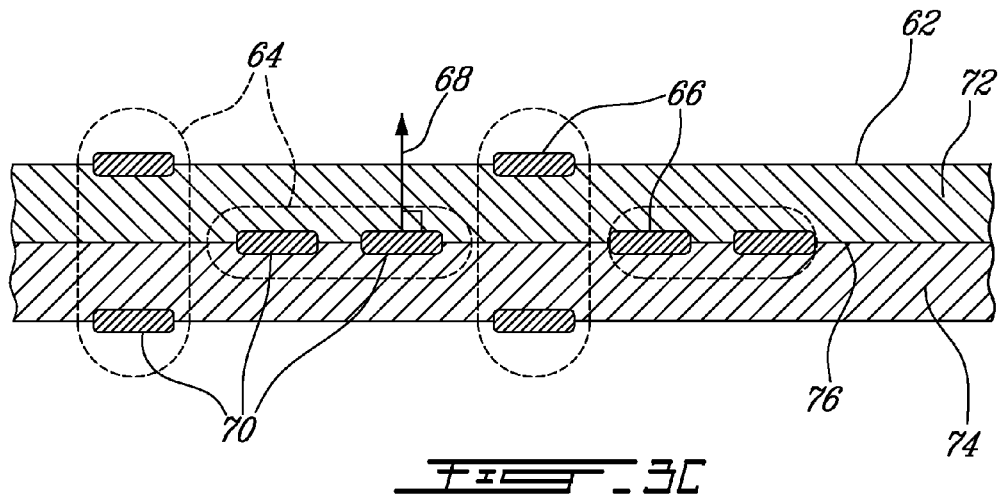

Referring now to FIG. 3C, a PCB 62 (viewed in transverse cross section) in accordance with in a second illustrative embodiment of the present invention is shown. A similar effect can be applied in the case of the PCB 62 by arranging balanced pairs of conductors as in 64, each comprised of typically two (2) conductive traces as in 66 etched in the PCB 62, such that the noise induced by the conductor(s) of one balanced pair on the conductor(s) of an adjacent balanced pair is either differential and effectively cancelled, or common and compensated for. Similarly, as the conductive traces are typically flat (or rectangular), further improvements can be obtained by ensuring that the conductive traces as in 66 of an adjacent balanced pair are not intersected by a line 68 which is perpendicular (or normal) to the long transverse surface(s) as in 70 of a conductive trace 66 of an adjacent balanced pair. Of note is that the PCB 62 as disclosed in FIG. 3C is a multilayer PCB comprised of a first layer 72 bonded to a second layer 74, thereby allowing conductive traces as in 66 to be applied along a centre line 76 between the first and second layers 72, 74.

Referring now to FIG. 4A, in a third illustrative embodiment of the present invention, an approach similar to the one described hereinabove can be used to reduce cross talk in a cable 78 (again viewed in transverse cross section) where the balanced pairs $80_1$, $80_2$, $80_3$, $80_4$ of conductors as in 82 are arranged around a central cable axis 84 and all conductors as in 82 are in parallel. In this regard, the conductors as in 82 are oriented such that the noise induced by the conductors as in 82 of a first balanced pair $80_1$ on the conductors as in 82 of an adjacent balanced pair $80_2$ or $80_4$ is either differential (as in the case of the conductors of balanced pair $80_4$) and effectively cancelled, or common (as in the case of the conductors of balanced pair $80_2$) and compensated for. A similar effect will be noted for other adjacent balanced pairs. Of note is that the conductors as in 82, although all in parallel, may be stranded around the axis 84 such that they follow a helical (or winding) path along the length of the cable 78.

Referring now to FIG. 4B, a cable 86 (again viewed in transverse cross section) comprised of four balanced pairs $88_1$, $88_2$, $88_3$, $88_4$ of conductors as in 90 and in accordance with a fourth illustrative embodiment of the present invention is shown. The conductors as in 90, all running substantially in parallel, are positioned relative to one other about a central axis 92 of the cable 86 such that the noise induced by the conductors of a first balanced pair such as pair $88_1$ on the conductors of adjacent balanced pairs $88_2$ or $88_4$ is either differential (as in the case of the conductors of balanced pair $88_4$) and effectively cancelled, or common (as in the case of the conductors of balanced pair $88_2$) and compensated for. A similar effect will be noted for other adjacent balanced pairs. Additionally, in order to improve performance, the conductors as in 90 are of substantially rectangular (or elongate) transverse cross section, each having two long surfaces as in 94, with the long surfaces of the conductors as in 90 of a given balanced pair $88_1$, $88_2$, $88_3$ or $88_4$ lying in the same plane when viewed in transverse cross section. The conductors as in 90 of a given balanced pair are oriented such that their long surfaces as in 94 are substantially at right angles to the long surfaces as in 94 of conductors as in 90 of an adjacent balanced pair.

Still referring to FIG. 4B, each of the four balanced pairs $88_1$, $88_2$, $88_3$, $88_4$ of conductors as in 90 is manufactured by encasing the conductors as in 90 within an insulation as in 96. The insulation as in 96 as illustrated is of substantially rectangular (or elongate) transverse cross section and is supported, in order to maintain the positioning of the balanced pairs, by a separator spline 98, typically manufactured from a pliable non-conductive insulating material such as plastic, having a substantially fylfot cross shaped transverse cross section. Additionally, although the individual conductors as in 90 all run in parallel, together with the spline 98 the conductors are typically stranded about the axis 92 such that they follow a helical, or winding, path along the length of the cable 86. Also, the assembly comprised of the spline 98 and the four balanced pairs $88_1$, $88_2$, $88_3$, $88_4$ of conductors as in 90 would also typically be covered by a cable jacket (not shown).

Figure 5:
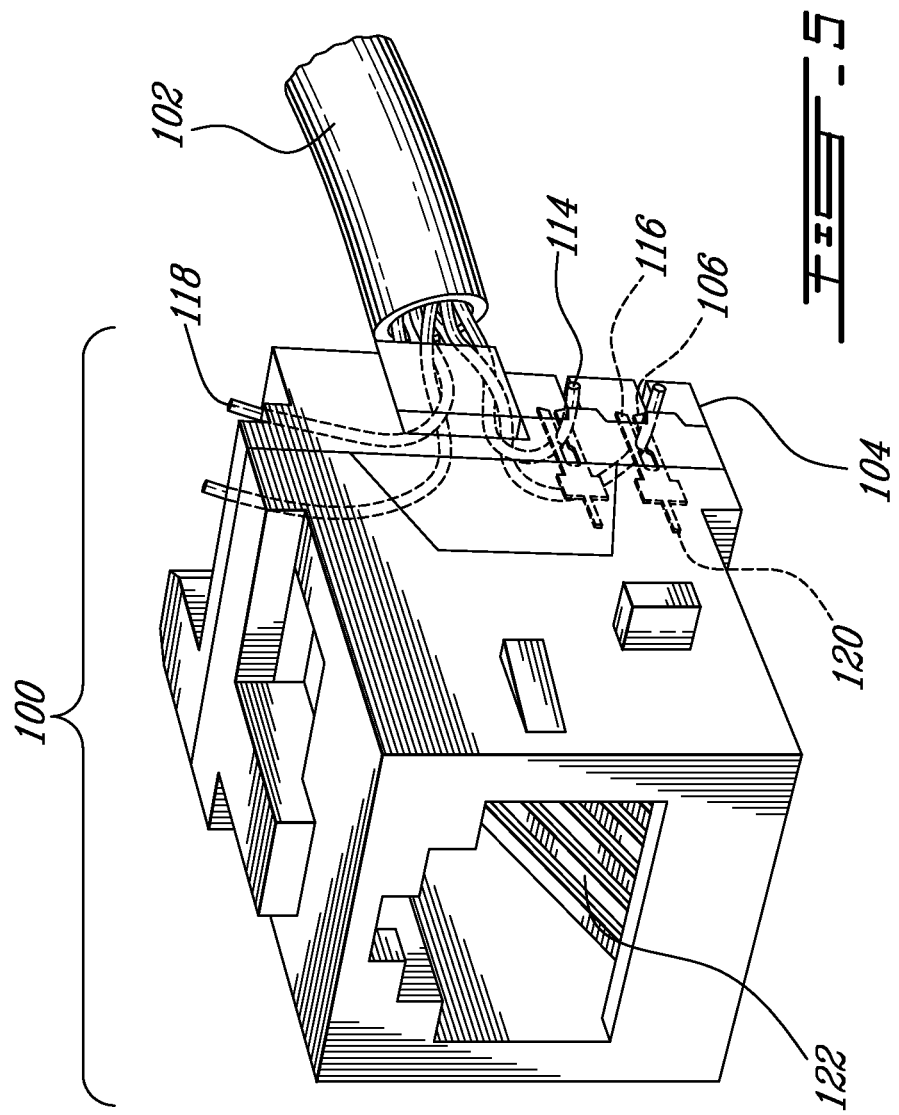
FIG. 5 provides a side perspective view of a connector jack and cable in accordance with a fifth alternative illustrative embodiment of the present invention.

Referring now to FIG. 5, a connector assembly, generally referred to using the numeral 100, and in accordance with a fifth illustrative embodiment of the present invention, will now be described. The connector assembly 100 generally refers to modular data transmission connectors having differential (balanced) transmission pairs (usually four (4) pairs). The connector 100 (or jack) provides an interface between two cables; a first cable (not shown) is usually terminated by a plug (also not shown), while a second cable, hereinafter referred to as connector cable 102, connects to the back panel 104 of connector 100, typically through a series of Insulation Displacement Connectors (IDCs) 106, or other connection means of the like.

Referring now to FIG. 6 in addition to FIG. 5, the connector cable 102 comprises four (4) twisted pairs of conductors 108 contained within an insulating cable jacket 110. As the pairs emerge from jacket 110, they are separated and guided through wire pair guide 112 to respective individual wire connector ports 114, both of which are part of the connector rear panel 104. Ideally, the twisted pairs 108 remain tightly twisted all the way through the wire pair guide 112 in order to minimize induced parasitic capacitances between single wires. The wire pair guide 112, as well as connector port 114, are typically manufactured from an insulating material which provides adequate insulation and shielding between the pairs as they emerge from cable jacket 110, and subsequently between individual conductors of the pairs 108 when they are terminally inserted into the individual connector ports 114.

Still referring to FIGS. 5 and 6, an appropriate set of IDCs 106, or other similar connection means generally comprising a bifurcated end 116 for electrically connecting with individual contact wires 118, and an elongated end 120 for electrically connecting with appropriate jack circuit means, briefly described hereinbelow, reach through the connector ports 114 to make contact with the individual wires 118 of connector cable 102. The signals, transmitted through the IDCs 106 from the individual wires 118, are subsequently brought to a respective one of a plurality of connector blades as in 122 of the jack (for example, an RJ-45 jack) by appropriate jack circuit means for connection with, and transmission to, an appropriate cable plug (not shown). Such a jack circuit means may include a variety of electrical components, such as wires, printed circuit boards (PCB), flexible printed circuit boards (Flex PCB), or any combination thereof. In the illustrated embodiment, the IDCs connect directly to a Flex PCB (not shown) through the elongated IDC ends 120 and a connecting material such as conductive solder (also not shown). The Flex PCB brings the transmitted signals directly to the connector blades 122 through a circuit printed thereon, which may be designed, if needed, to include various compensation capacitors that counter-balance parasitic reactances induced between the parallel connector blades 122.

Still referring to FIGS. 5 and 6, at the connector cable 102 end of the connector assembly 100, the IDCs 106 generally induce a certain amount of crosstalk between each other, either within a same connector (NEXT: Near End Crosstalk, FEXT: Far End Crosstalk), or between two adjacent connectors closely positioned together (AFEXT: Alien FEXT, ANEXT: Alien NEXT), which can significantly reduce the quality of the signals transmitted through the connector. As a matter of fact, since the creation of augmented Category 6 cabling requirements (generally referred to by those of skill in the art as Cat. 6e), crosstalk between two different channels (ANEXT and AFEXT) has become far more significant. Furthermore, the constant search for higher density and higher bandwidth (500 MHz, compared to 100 MHz for Cat. 5e) increases the impact of both ANEXT and AFEXT. Consequently, balancing methods and configurations are presented hereinbelow, and in accordance with illustrative embodiments of the present invention to considerably reduce, if not eliminate, IDC crosstalk not only within a same connector but also between adjacent connectors, and thereby providing a means for complying with advancing industry standards.

Referring now to FIG. 7, the cable-connector interfaces in the aforementioned systems are typically provided by IDC type connections. Generally, an IDC is made from a small metal conducting plate, figuratively illustrated in FIG. 7 as a substantially flat rectangle when viewed in transverse cross section, which can act as an emitting antenna in the presence of an electric potential. As discussed in detail hereinabove, a neighbouring, or adjacent IDC may act as a receiving antenna, and thus be affected (or coupled) by the parasitic signal provided by the emitting IDC. Accordingly, the parasitic signal emitted by the disturbing or emitting IDC pair 124 will emit a signal 126 which will be radiated outward in a direction primarily at right angles to a long surface 128, much like a typical antenna, generally following the illustrated radiation pattern 126. The disturbed or receiving IDC pair 130 will thus be affected by the radiated signal 126, and thus be a victim to crosstalk. Furthermore, a first disturbed IDC 132 is located closer to the emitting IDC pair 124 than a second disturbed IDC 134, and as a result the coupling effect will be greater for the first disturbed IDC 132 than the second disturbed IDC 134. Additionally, but of lesser effect, the first disturbed IDC 132 will act as a partial shield to the second disturbed IDC 134. Consequently, the parasitic signal induced by the emitting IDC pair 124 on the former will be stronger than the one induced on the latter, generating significant, and generally undesirable, differential mode noise on the receiving pair 130.

Accordingly, referring now to FIGS. 8A and 8B, and in accordance with sixth and seventh alternative illustrative embodiments of the present invention, two novel connector configurations generally represented by respective numerals 136 and 138 will now be described. The configurations 136 and 138 present important improvements over the parallel configuration illustrated in FIG. 7. Namely, the contacts of adjacent pairs (first or nearest neighbour pairs in both in X and Y) are perpendicularly oriented such that the adjacent pair does not lie directly within the main lobes of the signals emitted by the other pair, and vice-versa. This is applicable to both adjacent pairs within the same connector as well as adjacent pairs in adjacent connectors. Furthermore, the residual irradiated signal affecting adjacent pairs will either be symmetrically irradiated to both contacts of such pairs, at worst generating common mode noise of minimal importance, or will be irradiated such that the parasitic signal from one contact will be self-balanced by the parasitic signal of the second contact, thus generating no significant resultant noise.

More specifically considering the embodiment illustrated in FIG. 8A, and in line with the general discussion hereinabove, the interaction between first contact pair 140 and second contact pair 142 of a first connector 144 and first contact pair 146 and second contact pair 148 of a second connector 150 can be examined more closely. If the effect of the individual contacts 152, 154 of the first contact pair 140 of the first connector 144, illustratively and respectively characterized as positive (+) and negative (−) to reflect the differential nature of the propagated signal, on the individual contacts 156, 158 of the first contact pair 146 of the second connector 150 is studied, it can be observed that the parasitic signal induced by the positive contact 152 on both contacts 156, 158 of the first contact of the second connector 150 pair 146 will be counterbalanced by the parasitic signal induced by the negative contact 154 on the same contacts 156, 158. Furthermore, since the contacts of pair 146 are at least substantially perpendicular to the contacts of pair 140, their exposure to parasitic radiation from the latter will be minimized, as discussed hereinabove.

Figure 8A:
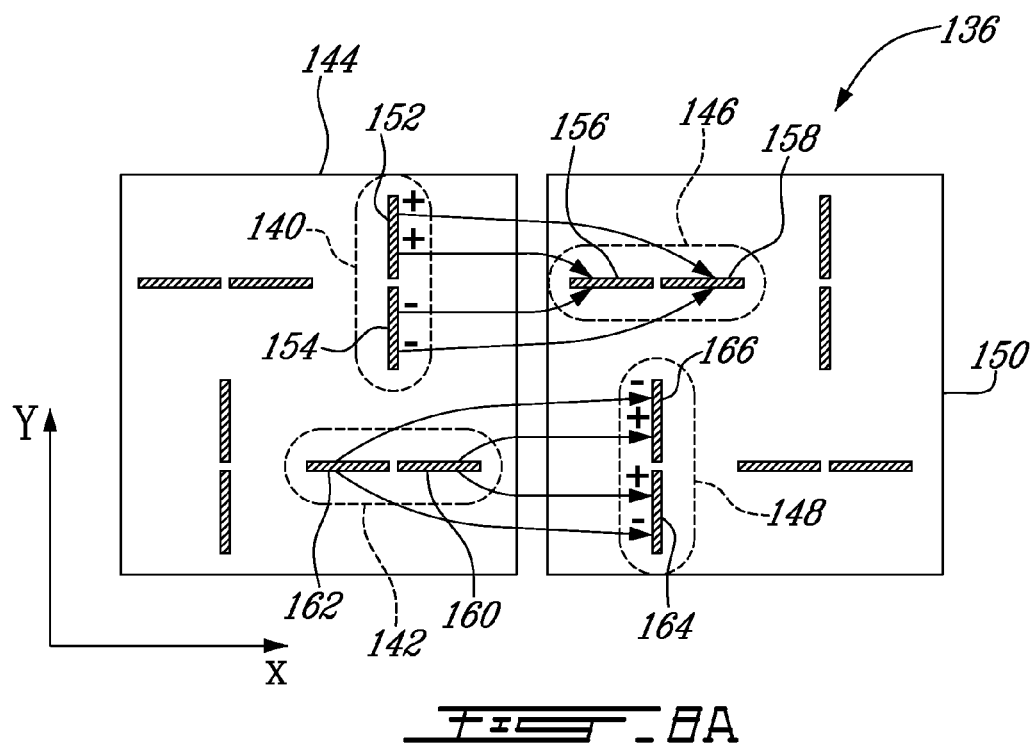
FIGS. 8A and 8B schematically illustrate connector configurations for reduced ANEXT and AFEXT in accordance with sixth and seventh alternative illustrative embodiments of the present invention.

Still referring to FIG. 8A, if the effect of the second contact pair 142 of the first connector 144 on the second contact pair 148 of the second connector 150 is studied, it can be observed that a parasitic signal radiated by a first contact 160 or a second contact 162 will symmetrically irradiate both contacts as in 164, 166 of the second contact pair 148 of the second connector 150, thus giving rise to common mode noise. A similar effect arises in reference to the other of the first and second contacts 160 or 162 which, as it is a differential signal, will tend to cancel to some degree the parasitic signal received by the contacts 164, 166. However, as contact 160 is located closer to than contact 162 to the contacts 164, 166 of the second contact pair 148 of the second connector 150, the strength of the received parasitic signal emitted by the first contact 160 will be greater than the received parasitic signal emitted by the second contact 162, thereby giving rise to common mode noise. Additionally, as contact 160 tends to shield contact 162 some common mode noise will still be induced into the contacts 164, 166. However, as discussed above, such common mode noise will be compensated for.

Figure 8B:
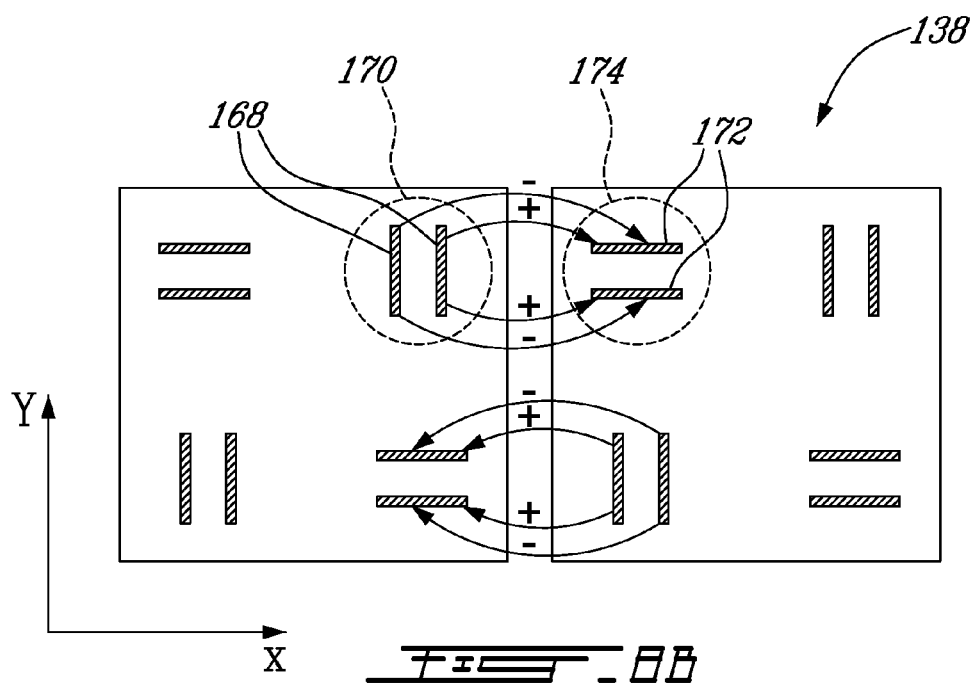

Referring now to FIG. 8B, by orienting the contacts as in 168 of a first balanced pair 170 such that they are perpendicular and symmetrical to the contacts 172 of a second balanced pair 174 parasitic signals emitted by one or other of the contacts as in 168 of the first balanced pair 170 will be received as common mode noise on either of the contacts 172 of the second balanced pair 174 and therefore compensated for. The same effect arises between the contacts of adjacent balanced pairs on the same connector as well as, as shown, between the contacts of adjacent balanced pairs on different connectors.

Physical and mechanical constraints can sometimes limit the potential for perfect crosstalk cancellation, for example by limiting the perpendicularity of adjacent contact pairs, or again by imposing certain asymmetries between the pairs, thus reducing the effectiveness of a symmetric parasitic radiation exposure and limiting the possibility of complete parasitic signal balancing. However, although such constraints may exist, significant improvements may still be attained with the general application of the above configuration guidelines, namely increased perpendicularity between adjacent or first neighbour contact pairs, and optimised symmetry, if not also complete balancing, of parasitic radiation between them.

Referring now to FIG. 9, and in accordance with a series of alternative illustrative embodiments of the present invention viewed in transverse cross section, pair configurations designated (a) through (h) to be considered for crosstalk and alien crosstalk reduction between substantially flat contacts terminating balanced pairs will now be described. The first pair configuration (a) is that as utilised in the connector configuration 136 of FIG. 8A. The other pair configurations provide a series of examples for reducing crosstalk between pairs, while not necessarily abiding by all of the aforementioned configuration guidelines. For example, (g) and (h) reduce crosstalk between pairs by their perpendicularity alone, whereas (a) and (e) provide reduced crosstalk based on both their mutual perpendicularity and irradiation symmetry. (c), which illustrates a staggered rather then perpendicular configuration, provides reduced crosstalk based on both irradiation symmetry between the pairs and a full balance of induced parasitic signals. (b) combines all three guidelines providing perpendicularity, symmetry and balance.

Figure 10:
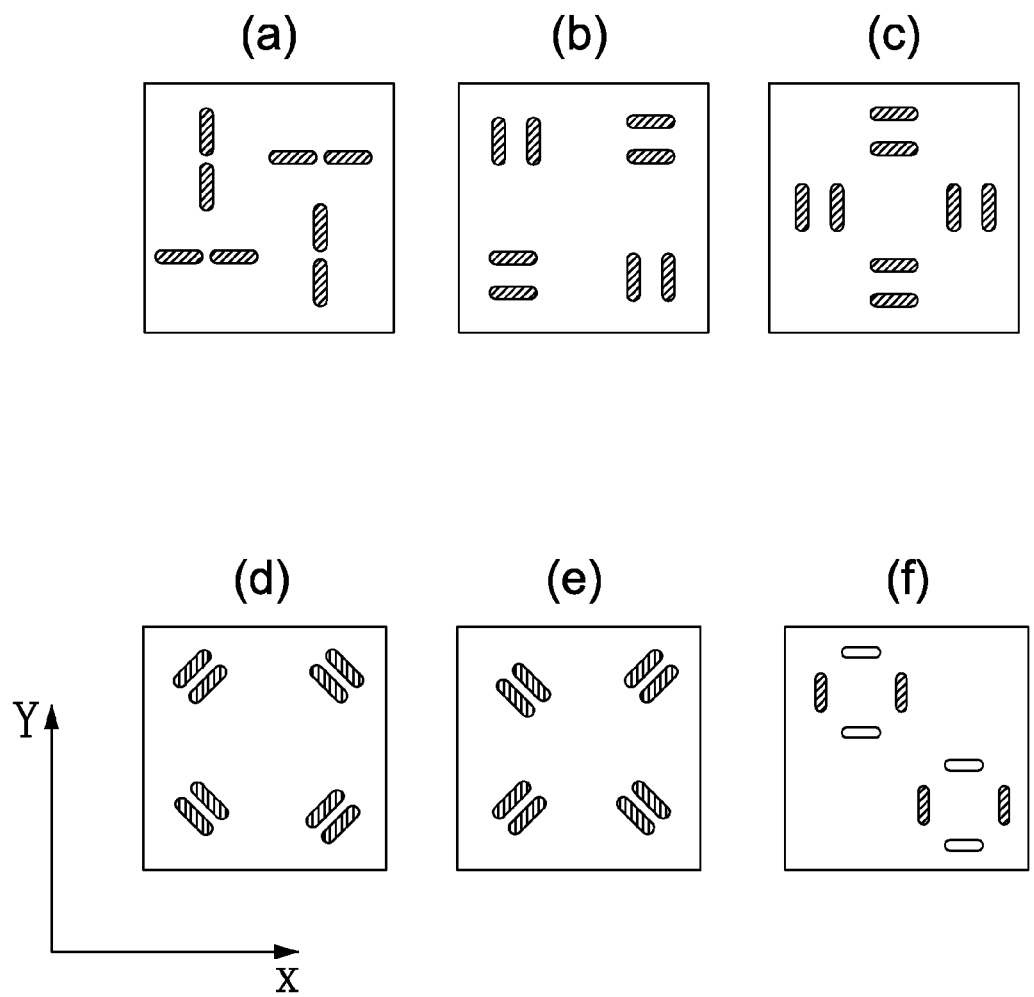
FIG. 10 schematically illustrates alternative connector or port configurations for reduced crosstalk in accordance with a series of alternative illustrative embodiments of the present invention.

Concurrently, similar pair configurations can be utilised in a full connector or port configuration to reduce crosstalk in both planar directions (X and Y). Referring now to FIG. 10, and in accordance with a further series of alternative embodiments of the present invention, connector or port configurations will now be described. In the first two port configurations, designated (a) and (b), the same configurations 136 and 138 respectively illustrated in FIGS. 8A and 8B are found, which provide both perpendicularity between pairs and substantially symmetric parasitic signal emission. Configurations (c), (d) and (e) all provide perpendicularity between adjacent pairs in both X and Y but limited symmetry, whereas configuration (f) provides perpendicularity, symmetry and balance for all adjacent pairs in X and Y. Consequently, all of the above port configurations may be considered to reduce crosstalk between pairs within a same connector.

Accordingly, with added reference to FIG. 11 in conjunction with FIG. 10, and in accordance with an illustrative embodiment of the present invention, configurations (a) through (f) presented in FIG. 10 may be utilised to reduce alien crosstalk between adjacent connectors. Namely, the panel configuration of FIG. 11 illustrates a two-dimensionally periodic configuration (in X and Y) of contact pairs that both reduces pair-to-pair crosstalk within a same connector, but also between connectors through perpendicularity and symmetry of parasitic signal emission between adjacent balanced pairs both within and between connectors. As it will now be apparent to a person skilled in the art, the use of other such configurations, as sampled from the examples illustrated in FIG. 10, can lead to similar results.

Though the advantages of such configurations have been discussed and illustrated as pertaining to connector assembly wire port configurations, it will now be apparent to a person skilled in the art that such configurations can also be useful in the design of other data transmission products such as PCBs, cables, connector boards, and other items of the like.

While this invention has been described with reference to the illustrative embodiments, this description is not intended to be construed to a limiting sense. Various modifications or combinations of the illustrative embodiments, as well as other embodiments of the invention, will be apparent to persons skilled in the art upon reference to the description. It is therefore intended that the described invention encompass any such modifications or embodiments.

We claim:

1. A method for reducing cross talk between first and second cables in a data transmission system, each of the cables comprised of a pair of conductors, the method comprising the steps of:
   providing a first contact directly interconnected with a first conductor of the pair of conductors of the first cable, wherein said first contact emits a first signal;
   providing a pair of contacts, each of said pair of contacts directly interconnected with a different conductor of the pair of conductors of the second cable; and
   positioning said first contact relative to said pair of contacts such that an amplitude of said first signal received at one of said second pair of contacts is the same as the amplitude of said first signal received at another of said second pair of contacts.

2. The method of claim 1, further comprising the steps of providing a second contact directly interconnected with a second conductor of the pair of conductors of the first cable and wherein said second contact emits a second signal, and positioning said second contact relative to said pair of contacts such that an amplitude of said second signal received at one of said second pair of contacts is the same as an amplitude of said second signal received at another of said second pair of contacts.

3. The method of claim 1, wherein each of said contacts is flat and said positioning step comprises orienting said contacts such that a long surface of said first contact is perpendicular to a long surface of each of said pair of contacts.

4. The method of claim 1, wherein said positioning step comprises placing said pair of contacts symmetrically about said first contact.

5. The method of claim 1, wherein said positioning step comprises placing said first contact equidistant from each of said pair of contacts.

6. The method of claim 1, wherein each of said pair of contacts is flat and said positioning step comprises placing said first contact such that a line normal to a long surface of either of said pair of contacts does not intersect said first contact.

7. The method of claim 1, wherein each of the pair of conductors are twisted.

8. The method of claim 1, wherein each of the pair of conductors are in parallel.

9. A method for reducing cross talk between first and second cables in a data transmission system, each of the cables comprised of a pair of conductors, the method comprising the steps of:
   providing a pair of contacts, each of said pair of contacts directly interconnected with a different conductor of the pair of conductors of the first cable, wherein one of said pair of contacts emits a first signal which is an inverse of a second signal emitted by another of said pair of contacts;
   providing at least one first contact directly interconnected with one of the pair of conductors of the second cable; and
   positioning said pair of contacts relative to said first contact such that an amplitude of said first signal received by said first contact is opposite to an amplitude of said second signal received by said first contact.

10. The method of claim 9, further comprising the steps of providing a second contact directly interconnected with a second conductor of the pair of conductors of the second cable and positioning said pair of contacts relative to said second contact such that an amplitude of said first signal received by said second contact is opposite to an amplitude of said second signal received by said second contact.

11. The method of claim 9, wherein each of said contacts is flat and said positioning step comprises orienting said contacts such that a long surface of said first contact is perpendicular to a long surface of either of said pair of contacts.

12. The method of claim 9, wherein said positioning step comprises placing said pair of contacts symmetrically about said first contact.

13. The method of claim 9, wherein said positioning step comprises placing said first contact equidistant from each of said pair of contacts.

14. The method of claim 9, wherein each of said contacts is flat and said positioning step comprises placing said first contact such that a line normal to a long surface of either of said pair of contacts does not intersect said first contact.

15. A method for reducing cross talk in a data transmission system, the method comprising the steps of:
   providing a first transmission path comprised of at least one first conductor, said first conductor emitting a signal;
   providing a second transmission path comprised of a second pair of conductors;
   positioning said first conductor relative to said second pair of conductors such that an amplitude of said signal received along one of said second pair of conductors is the same as an amplitude of said signal received along another of said second pair of conductors.

16. The method of claim 15, wherein each of said conductors comprises a conductive trace etched on a Printed Circuit Board (PCB).

17. The method of claim 15, further comprising the step of surrounding said first and second transmission path with a cable housing.

18. The method of claim 15, wherein said first transmission path further comprises a second conductor, said second conductor emitting a second signal, and further comprising the step of positioning said second conductor relative to said pair of conductors such that an amplitude of said second signal received at one of said second pair of contacts is the same as an amplitude of said second signal received at another of said second pair of contacts.

19. The method of claim 15, wherein said positioning step comprises placing said pair of conductors symmetrically about said first conductor.

20. The method of claim 15, wherein said conductors are arranged in parallel.

21. The method of claim 15, wherein said positioning step comprises placing said first conductor at the same distance from each of said pair of conductors.

22. The method of claim 15, wherein each of said conductors comprises an elongate transverse cross section and said positioning step comprises placing said first conductor such that a line normal to a long surface of either of said pair of conductors does not intersect said first conductor.

23. The method of claim 15, wherein each of said conductors comprises an elongate transverse cross section and said positioning step comprises orienting said conductors such that a long surface of said first conductor is perpendicular to a long surface of each of said pair of conductors.

24. A method for reducing cross talk in a data transmission system, the method comprising the steps of:
   providing a first transmission path comprised of a first conductor;
   providing a second transmission path comprised of a pair of conductors, wherein one of said pair of conductors emits a first signal which is an inverse of a second signal emitted by another of said pair of conductors; and
   positioning said pair of conductors relative to said first conductor such that an amplitude of said first signal received by said first conductor is opposite to an amplitude of said second signal received by said first conductor.

25. The method of claim 24, wherein said first transmission path further comprises a second conductor, and further comprising the step of positioning said pair of conductors relative to said second conductor such that an amplitude of said first signal received by said second conductor is opposite to an amplitude of said second signal received by said second conductor.

26. The method of claim 24, wherein said positioning step comprises placing said pair of conductors symmetrically about said first conductor.

27. The method of claim 24, wherein said conductors are arranged in parallel.

28. The method of claim 24, wherein said positioning step comprises placing said first conductor at the same distance from each of said pair of conductors.

29. The method of claim 24, wherein each of said conductors comprises an elongate transverse cross section and said positioning step comprises placing said first conductor such that a line normal to a long surface of either of said pair of conductors does not intersect said first conductor.

30. The method of claim 24, wherein each of said conductors comprises an elongate transverse cross section and said positioning step comprises orienting said conductors such that a long surface of said first conductor is perpendicular to a long surface of each of said pair of conductors.

* * * * *